United States Patent

Boaz et al.

[15] 3,688,236
[45] Aug. 29, 1972

[54] ELECTRICAL INDUCTIVE APPARATUS HAVING SERIALLY INTERCONNECTED WINDINGS

[72] Inventors: Virgil L. Boaz, Daleville; Harold R. Moore, Muncie, both of Ind.

[73] Assignee: Westinghouse Electric Corp., Pittsburgh, Pa.

[22] Filed: March 12, 1971

[21] Appl. No.: 123,590

[52] U.S. Cl.................................................336/187
[51] Int. Cl...........................................H01f 27/28
[58] Field of Search..........336/186, 187, 69, 70, 180, 336/182, 183

[56] References Cited

UNITED STATES PATENTS

| | | |
|---|---|---|
| 3,183,465 | 5/1965 | Moore........................336/187 |
| 3,023,386 | 2/1962 | Wentz et al................336/187 |
| 1,872,247 | 8/1932 | Cole et al................336/187 X |
| 3,348,182 | 10/1967 | Baker et al. ...............336/187 |
| 3,283,280 | 11/1966 | Fischer......................336/187 |
| 1,253,166 | 1/1918 | Frank et al.............336/187 X |
| 3,467,931 | 9/1969 | Dutton...................336/187 X |

Primary Examiner—Thomas J. Kozma
Attorney—A. T. Stratton and F. E. Browder

[57] ABSTRACT

Electrical inductive apparatus having interleaved winding groups. The conductors forming the coils in the winding groups are divided into at least two conductor groups by unique lead brazing techniques. The series connection, which interconnects the winding groups, is divided into at least two conductor groups which are brazed together individually. The opposing relationship of the leakage flux induced voltages provided by this invention reduces the circulating currents in the winding.

14 Claims, 9 Drawing Figures

Patented Aug. 29, 1972

Patented Aug. 29, 1972
3,688,236
2 Sheets-Sheet 2
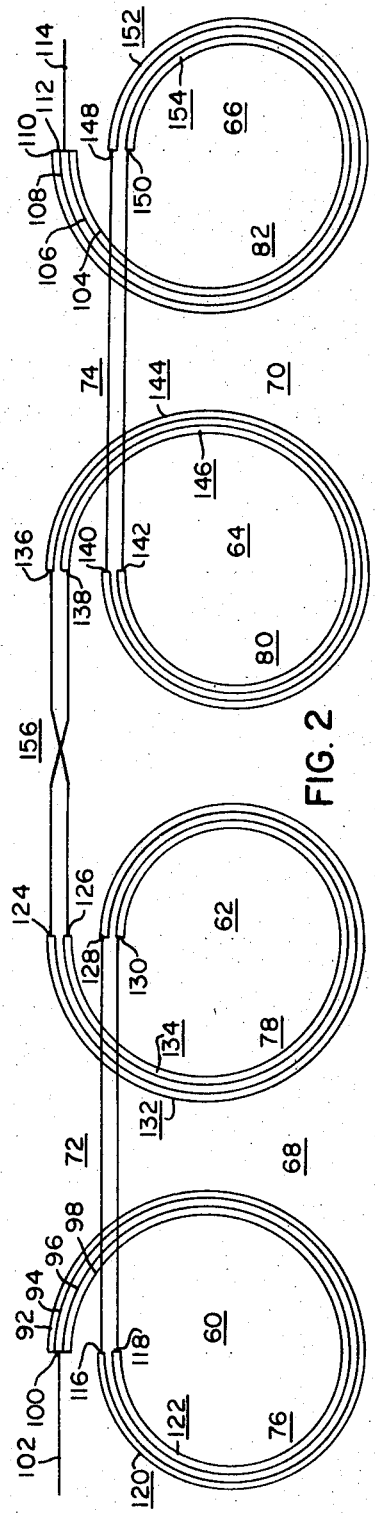
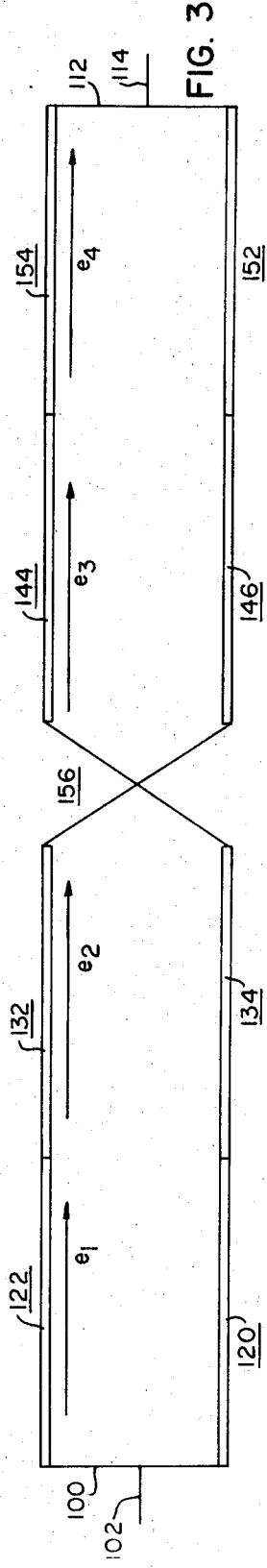
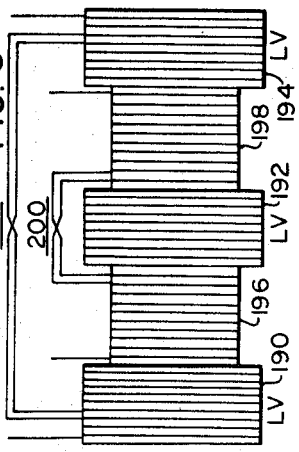
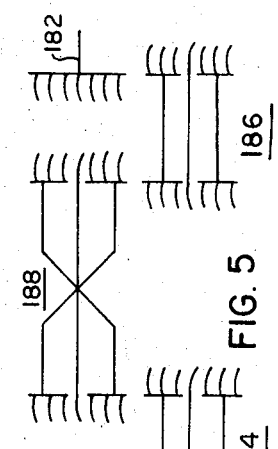
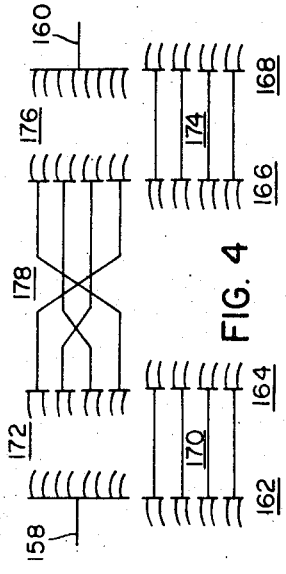

ELECTRICAL INDUCTIVE APPARATUS HAVING SERIALLY INTERCONNECTED WINDINGS

CROSS REFERENCE TO RELATED APPLICATION

In copending application Westinghouse Case No. 42,664, Ser. No. 123,548, filed Mar. 12, 1971, and assigned to the same assignee as this application, there is disclosed an arrangement for serially interconnecting the coils of electrical inductive apparatus.

BACKGROUND OF THE INVENTION

1. Field of the Invention

This invention relates, in general, to electrical inductive apparatus and, more specifically, to electrical inductive apparatus having serially interconnected winding groups.

2. Description of the Prior Art

Electrical inductive apparatus operating at high power levels exhibit various effects which reduce the efficiency and reliability of the apparatus. Prominent among these is the heating of the conductors due to eddy-current losses. Eddy-current losses in a conductor of a transformer winding are proportional to the square of the dimension of the conductor which is at right angles to the leakage flux. Eddy-current losses may thus be reduced by subdividing the required conductor area into two or more parallel connected conductive elements or strands, which are insulated from each other. To prevent an offsetting increase in losses due to circulating currents between the parallel connected strands, the relative position of the strands are transposed with respect to the leakage flux, in an attempt to obtain the same net flux leakages for each strand. If the parallel loops are long, the impedance of the loops aids in reducing circulating currents, but it is still important to obtain a highly efficient transposition of the conductive strands. In practice, however, ideal transpositions are impractical and undesirable circulating currents exist.

Circulating currents are particularly troublesome in shell-form type power transformers having a plurality of individual coils connected in series. According to the prior art, interconnection of the coils requires that the conductors forming each coil have their strands brazed together at each end of each coil. This permits currents to circulate within the individual coils. Therefore, it is desirable to provide a method whereby the circulating currents in serially interconnected windings may be reduced.

SUMMARY OF THE INVENTION

This invention provides a new and useful concept reducing the total eddy-current losses in a transformer winding having serially interconnected winding groups. The conductors which form the coils of the winding are divided into at least two conductor groups. These conductor groups are electrically separated throughout a winding group and are connected together by a series connection between the winding groups. The series connection is made in such a manner that the induced voltage due to the leakage flux in one winding group opposes the induced voltage due to the leakage flux in the other winding group. The resulting opposition of the leakage flux voltages substantially reduces the eddy-currents flowing from one conductor group to another conductor group. The heat generated in the winding is reduced and the efficiency of the apparatus is improved.

BRIEF DESCRIPTION OF THE DRAWING

Further advantages and use of this invention will become more apparent when considered in view of the following detailed description and drawing, in which:

FIG. 2 is a schematic diagram of a winding interconnection arrangement as taught by this invention;

FIG. 3 is a schematic diagram illustrating the relationship between the leakage flux induced voltages for the winding of FIG. 2;

FIG. 4 is a diagram illustrating an arrangement for interconnecting a winding having eight strands as taught by this invention;

FIG. 5 is a diagram illustrating an arrangement for interconnecting a winding having seven strands as taught by this invention; and FIG. 6 is a partial elevational view of a "4 High-Low" winding structure of a shell-form type power transformer.

DESCRIPTION OF THE PREFERRED EMBODIMENTS

Figure 1:
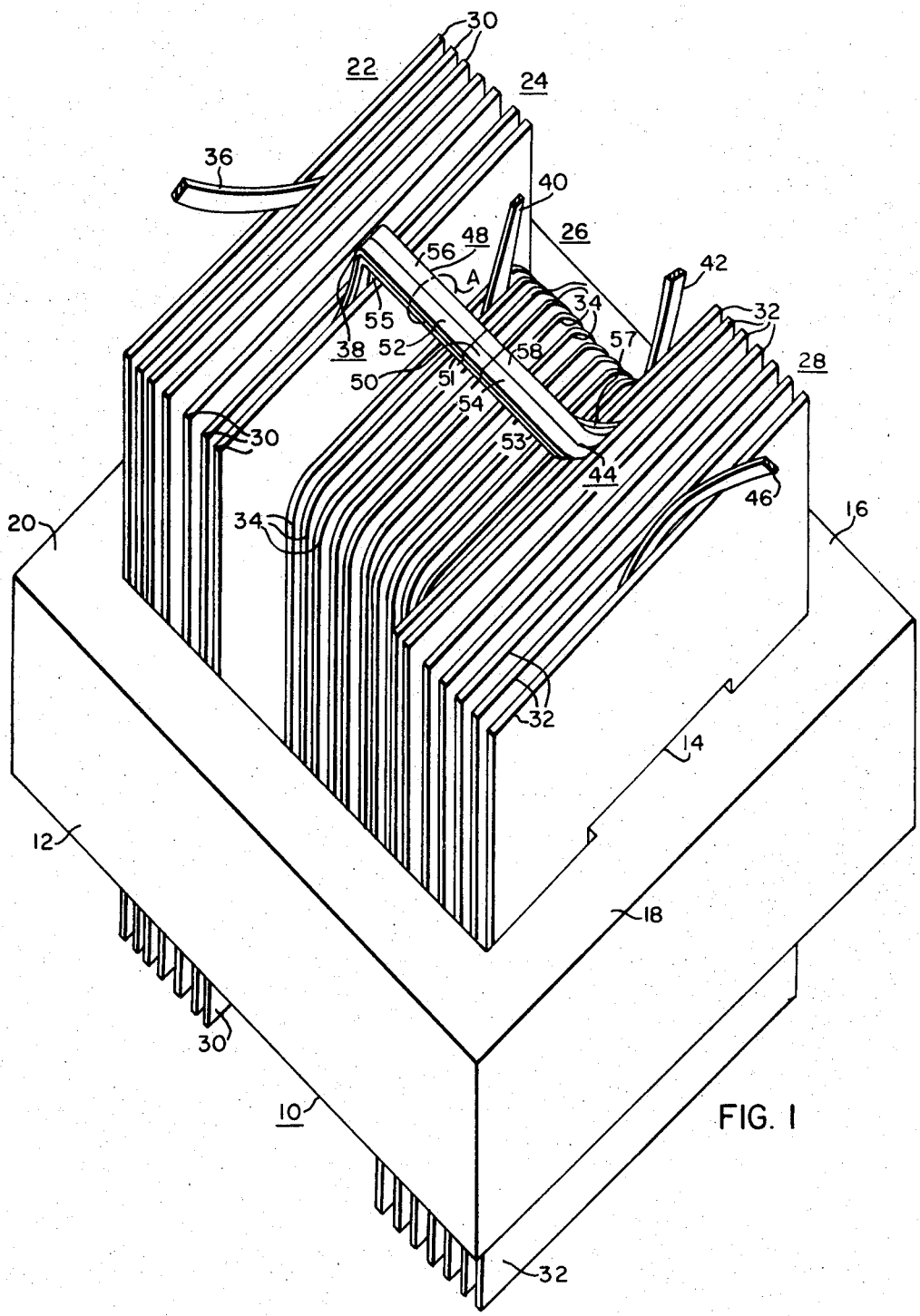
FIG. 1 is an orthographic view of the winding and core structures of a shell-form type power transformer.

Throughout the following description similar reference characters refer to similar members in all figures of the drawing.

Referring now to the drawing, and FIG. 1 in particular, there is shown the electric and magnetic structures of a shell-form type power transformer. The laminated magnetic core 10 includes the legs 12, 14 and 16 and the yokes 18 and 20. The legs and yokes are formed from a plurality of laminations which are assembled around the winding structure 22.

The winding structure 22 includes a low voltage winding group 24, a high voltage winding group 26 and a low voltage winding group 28. Each winding group comprises substantially flat rectangular coils wound with conductors spirally disposed around the core leg 14. The coils of the low voltage winding group 24 are separated from each other by the insulating washers 30. The coils of the low voltage winding group 28 are separated from each other by the insulating washers 32. The coils of the high voltage winding group 26 are separated from each other by the insulating washers 34.

The conductors forming the coils may comprise one or more insulated strands or layers of strands. The strands may be transposed within the coils to reduce the effects of leakage flux. Interconnection between coils within a winding group, although not illustrated, may be made by alternate start-start and finish-finish conductor connections. Winding group leads are used for connecting each winding group to an external circuit and/or other winding groups. The leads 36 and 38 of the winding group 24, the leads 40 and 42 of the winding group 26, and the leads 44 and 46 of the winding group 28 are all used for connecting their respective winding groups to other groups or circuits.

Figure 1A:
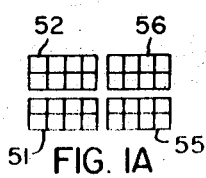
FIGS. 1A, 1B and 1C are sectional views taken at the area "A" of FIG. 1 illustrating conductor strand grouping arrangements which are taught by this invention.
Figure 1B:
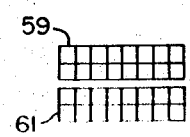
Figure 1C:
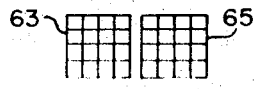

The leads 38 and 44 are brazed together at position 50 to form a series connection 48 between the low voltage winding groups 24 and 26. According to this invention, the conductors forming the series connection 48 are divided into at least two groups. Four groups are shown in FIG. 1 to illustrate the possible methods of dividing. The group 52 is brazed to the conductor group 54, the conductor group 56 is brazed to the conductor group 58, the conductor group 51 is brazed to the conductor group 53, and the conductor group 55 is brazed to the conductor group 57. Each conductor group may contain one or more conductor strands. FIG. 1A is a cross-sectional view of the series connection 48 at the area "" in FIG. 1 and illustrates the division of the conductor strands to reduce the effects of both the horizontal and vertical components of the leakage flux. FIG. 1B illustrates a division of the conductor strands which would be used to reduce the effects of the vertical component of the leakage flux. The conductor is divided into the conductor groups 59 and 61 and overbrazed to similar conductor groups from the lead 44. FIG. 1C illustrates a division of the conductor strands which would be used to reduce the effects of the horizontal component of the leakage flux. The conductor is divided into the conductor groups 63 and 65 and are brazed to similar conductor groups from the lead 44.

The conductors are bent as shown so that the conductor groups of the low voltage winding group 24 are electrically connected to the conductor groups of the low voltage winding group 28 which are at opposite radial and axial positions. This effectively provides a transposition of the conductor groups by the series connection 48. The result is that the voltages which are developed in the conductor groups of each low voltage winding group due to the leakage flux oppose each other. This reduces the circulating currents, the heating of the winding, and the losses of the transformer.

The electrical connections for serially interconnected winding groups is illustrated in FIG. 2. Other connecting arrangements will be discussed later. The coils 60, 62, 64 and 66 are shown moved to the side of each other for clarity. Physically, the coils would be aligned over each other. This can be visualized by moving the coil 62 to the left so that it is directly over the coil 60, by moving the coil 64 so that it is directly over the coils 62 and 60, and be moving the coil 66 so that it is directly over the coils 64, 62 and 60. The coils 60 and 62 form a winding group 68 and the coils 64 and 66 form a winding group 70. Any number of coils may comprise a winding group by interconnecting alternate start-start and finish-finish conductors. The two coils shown per winding group are electrically connected by the start-start connections 72 and 74. Although this invention is applicable to windings which have physically adjacent winding groups, it is particularly useful in windings having groups of coils which are physically separated from each other by other windings, such as shown in FIG. 1. By analogy, the high voltage winding shown in FIG. 1 would be placed between the winding groups 72 and 74 in FIG. 2.

The coils 60, 62, 64 and 66 are shown wound with the conductors 76, 78, and 80 and 82, respectively. Each conductor may comprise a plurality of insulated strands or layers of strands. The coils of FIG. 2 each have four strands. Although not illustrated, the coils may contain conductor strand transpositions. Methods for making the transpositions within the coils are described in U.S. Pat. No. 3,283,280, patented Nov. 1, 1966, and in pending application Ser. No. 876,769, filed Nov. 14, 1969, now U.S. Pat. No. 3,602,860, both being assigned to the same assignee as this invention. The coils 60, 62, 64 and 66 may, and usually do, comprise more than one coil turn. However, the single coil turn shown in FIG. 2 is sufficient to illustrate the invention.

The conductor strands 92, 94, 96 and 98 of the coil 60 are electrically connected at the braze position 100, to which is connected a winding lead 102. The conductor strands 104, 106, 108 and 110 of the coil 66 are electrically connected at the braze position 112, to which is connected a winding lead 114. The braze positions 116 and 118 electrically divide the conductor 76 into two conductor groups, 120 and 122, respectively. The braze positions 124, 126, 128 and 130 divide the conductor 78 into two conductor groups, 132 and 134. The braze positions 136, 138, 140 and 142 divide the conductor 80 into two conductor groups, 144 and 146. The braze positions 148 and 150 divide the conductor 82 into two conductor groups, 152 and 154, respectively.

Ideally, conductor strand transpositions such as described in U.S. Pat. No. 3,283,280, would eliminate the circulating currents due to one component of the leakage flux and the pattern of the remaining component would result in negligible losses. In reality, the transpositions cannot be placed at the ideal location for zero losses due to one component of the leakage flux and the pattern of the other component deviates considerably from the ideal case. This invention utilizes the similarity of the leakage flux patterns in serially interconnected winding groups to provide the cancelling effect. This is accomplished by horizontally and/or vertically dividing the series connection into two or more conductor groups.

FIG. 3 schematically represents the conductors of FIG. 2. The net induced voltages $e_1$, $e_2$, $e_3$ and $e_4$ of the conductor groups of the coils 60, 62, 64 and 66, respectively, have substantially equal amplitudes. Therefore, the sum of $e_1$ and $e_2$ and the sum of $e_3$ and $e_4$ are nearly equal and the reversal characteristic furnished by the divided series connection 156 causes the resultant loop voltage to be substantially reduced. Thus, circulating currents between the conductor groups are effectively eliminated and the overall circulating currents within the winding are substantially reduced.

FIG. 4 illustrates, in abbreviated form, an interconnection arrangement for coils having conductors comprising eight strands or strand groups. The leads 158 and 160 are at opposite ends of the complete winding which consists of the four coils 162, 164, 166 and 168. The start-start connection 170 between the coils 162 and 164 forms the winding group 172. The start-start connection 174 between the coils 166 and 168 forms the winding group 176. The winding groups 172 and 176 are interconnected by the series connection 178.

Although the eight strand arrangement of FIG. 4 is divided into four conductor groups, other arrangements may be used. For example, four conductor strands may be brazed together to form two conductor groups. With this arrangement, the series connection 178 and the coil connections 170 and 174 would have two conductor groups.

FIG. 5 illustrates, in abbreviated form, an interconnection arrangement for coils having conductors comprising seven strands or strand groups. The leads 180 and 182 are at opposite ends of the complete winding. The start-start connections 184 and 186 and the series connection 188 are connected as shown. The seven strands are divided into three conductor groups. One group containing a single strand and two groups each containing three strands.

Other arrangements are apparent from the examples described herein. Generally, any number of strands or strand groups may be combined to form at least two conductor groups which are transposed by the series connection.

The "four High-Low" coil design shown in FIG. 6 comprises three low voltage winding groups 190, 192 and 194 and two high voltage winding groups 196 and 198. The conductors of the high voltage winding groups may be grouped and connected as taught by this invention. The series connection 200 illustrates the connecting arrangement when the conductors are divided into two groups. Similarly, the series connection 202 connects conductor groups of the low voltage winding groups 190 and 194 together as taught by this invention. Other leads from the winding groups 190, 192 and 194 are not illustrated. Specialized arrangements may include other series connections between the coils of the winding groups.

Since numerous changes may be made in the connecting arrangement described herein without departing from the teachings of this invention, it is intended that all matter contained in the foregoing description or shown in the accompanying drawing shall be interpreted as illustrative, and not in a limiting sense.

We claim as our invention:

1. An arrangement for electrically interconnecting a transformer winding, said winding comprising a plurality of winding groups, each of said winding groups having at least one pancake-type coil, said coil having at least one conductor spirally wound for at least one coil turn, said conductor having a plurality of insulated strands, said conductor being electrically divided into a plurality of conductor groups with each conductor group positioned at a different radial position in said conductor, each of said conductor groups having a plurality of insulated strands, the conductor groups from a first of said winding groups being electrically connected to the conductor groups from a second of said winding groups by a series connection, said series connection serially interconnecting said winding groups, said series connection electrically connecting together the conductor groups of said winding groups which are at radially opposite positions within the conductors.

2. The arrangement for electrically interconnecting a transformer winding of claim 1 wherein the transformer winding comprises only two winding groups.

3. The arrangement for electrically interconnecting a transformer winding of claim 1 wherein the winding groups each have a plurality of pancake-type coils.

4. The arrangement for electrically interconnecting a transformer winding of claim 1 wherein the winding groups each have a plurality of pancake-type coils and wherein the coils within a winding group have their conductor groups electrically connected so that the conductor groups from one coil are electrically connected to the conductor groups from and adjacent coil which are radially and axially at the same position within the conductors.

5. The arrangement for electrically interconnecting a transformer winding of claim 1 wherein the conductors of the winding groups are electrically divided into only two conductor groups.

6. The arrangement for electrically interconnecting a transformer winding of claim 1 wherein the series connection comprises a first grouped conductor lead which is electrically connected to a finish coil turn of the first winding group, a second grouped conductor lead which is electrically connected to a finish coil turn of the second winding group, said first grouped lead extending radially outward from said finish coil turn to a first position outside the winding group, said first grouped lead being bent at said first position and extending in an axial direction which is substantially parallel to the axis of the winding group to a third position, said second grouped lead extending radially outward from said finish coil turn to a second position outside the winding group, said second grouped lead being bent at said second position and extending in a direction which is substantially parallel to the axis of the winding group to said third position, said first and second grouped leads being electrically interconnected at said third position.

7. An arrangement for electrically interconnecting a transformer winding, said winding comprising a plurality of winding groups, each of said winding groups having at least one pancake-type coil, said coil having at least one conductor spirally wound for at least one coil turn, said conductor having a plurality of insulated strands, said insulated strands being grouped together to form a plurality of conductor groups with each conductor group positioned at a different radial position in said conductor, each of said conductor groups having a plurality of insulated strands, said conductor groups having said strands electrically connected together at the beginning position of the start turn of said coil and at the ending position of the finish turn of said coil, said conductor groups from a first of said winding groups being electrically connected to said conductor groups from a second of said winding groups by a series connection, said series connection serially interconnecting said winding groups, said series connection electrically connecting together the conductor groups of said winding groups which are at radially opposite positions within the conductors with the strands of said conductor groups being brazed together at a position outside said winding groups.

8. The arrangement for electrically interconnecting a transformer winding of claim 7 wherein the transformer winding comprises only two winding groups.

9. The arrangement for electrically interconnecting a transformer winding of claim 7 wherein the winding groups each have a plurality of pancake-type coils.

10. The arrangement for electrically interconnecting a transformer winding of claim 7 wherein the winding groups each have a plurality of pancake-type coils and wherein the coils within a winding group have their conductor groups electrically connected so that the conductor groups from one coil are electrically connected to the conductor groups from an adjacent coil which are radially and axially at the same position within the conductors.

11. The arrangement for electrically interconnecting a transformer winding of claim 7 wherein the coil has a plurality of conductors.

12. The arrangement for electrically interconnecting a transformer winding of claim 7 wherein the strands are grouped together to form only two conductor groups.

13. A power transformer comprising a shell-form type laminated magnetic core, a pancake-type winding structure disposed in inductive relationship with said laminated magnetic core, said winding structure having a plurality of winding groups which are physically separated by at least one other winding group, said separated winding groups each having a plurality of pancake-type coils, said coils having at least one conductor spirally wound for a plurality of coil turns, said conductor having a plurality of insulated strands, said insulated strands being grouped together to form a plurality of conductor groups with each conductor group positioned at a different radial position in said conductor, each of said conductor groups having a plurality of insulated strands, said conductor groups having said strands electrically connected together at the beginning position of the start turn of said coil and at the ending position of the finish turn of said coil, wherein the coils within a winding group have their conductor groups electrically interconnected so that the conductor groups from one coil are electrically connected to the conductor groups from an adjacent coil which are radially and axially at the same position within the conductors with the strands of said conductor groups being brazed together at a position outside said winding groups.

14. The power transformer of claim 13 wherein less than the total number of coils in a winding group are electrically connected together and serially connected to another winding group by the series connection.

* * * * *